United States Patent
Zhang et al.

(10) Patent No.: US 11,775,880 B2
(45) Date of Patent: Oct. 3, 2023

(54) INTELLIGENT RESERVATION METHOD AND DEVICE FOR SEAT, AND COMPUTER-READABLE STORAGE MEDIUM

(71) Applicants: BEIJING BOE DISPLAY TECHNOLOGY CO., LTD., Beijing (CN); BOE TECHNOLOGY GROUP CO., LTD., Beijing (CN)

(72) Inventors: Guohua Zhang, Beijing (CN); Nan Chen, Beijing (CN); Yu Xiao, Beijing (CN); Dong Wang, Beijing (CN); Yongzhi Song, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 1058 days.

(21) Appl. No.: 16/412,600

(22) Filed: May 15, 2019

(65) Prior Publication Data
US 2020/0050977 A1  Feb. 13, 2020

(30) Foreign Application Priority Data
Aug. 9, 2018  (CN) .......................... 201810902289.4

(51) Int. Cl.
*G06Q 10/02* (2012.01)
*G06F 3/14* (2006.01)
(Continued)

(52) U.S. Cl.
CPC ............... *G06Q 10/02* (2013.01); *G06F 3/14* (2013.01); *H04L 51/02* (2013.01); *H04L 67/01* (2022.05)

(58) Field of Classification Search
CPC .......... G06Q 10/02; G06F 3/14; H04L 51/02; H04L 67/42; H04L 67/12
See application file for complete search history.

(56) References Cited

U.S. PATENT DOCUMENTS

2012/0197671 A1   8/2012  Postrel et al.
2013/0297358 A1* 11/2013  Kim ....................... G06Q 10/02
                                                              705/5
(Continued)

FOREIGN PATENT DOCUMENTS

| CN | 106991486 | * | 7/2017 |
| CN | 107392339 |   | 11/2017 |
| CN | 107610518 |   | 1/2018 |

OTHER PUBLICATIONS

Chinese Patent Office Action dated Apr. 26, 2021 corresponding to Chinese Patent Application No. 201810902289.4; 17 pages.

*Primary Examiner* — Jennifer N Welch
*Assistant Examiner* — Amy P Hoang
(74) *Attorney, Agent, or Firm* — Leason Ellis LLP (57) ABSTRACT

Provided are an intelligent reservation method and device for a seat, and a computer-readable storage medium. The intelligent reservation method for a seat includes: sending a seat information acquisition request; receiving and displaying seat distribution information and seat usage status information of a target site fed back by a server-end device for the seat information acquisition request; receiving a reservation request for a target seat inputted by a user, and sending the reservation request; and receiving and displaying a reservation success message or a reservation failure message fed back by the server-end device for the reservation request.

13 Claims, 7 Drawing Sheets

(51) Int. Cl.
*H04L 51/02* (2022.01)
*H04L 67/01* (2022.01)

(56) References Cited

U.S. PATENT DOCUMENTS

| | | | |
|---|---|---|---|
| 2015/0242916 A1* | 8/2015 | Godsey | G06Q 30/08 |
| | | | 705/5 |
| 2016/0063400 A1* | 3/2016 | Lee | G06Q 10/02 |
| | | | 705/5 |
| 2017/0286875 A1* | 10/2017 | Luo | G06Q 10/02 |
| 2017/0372551 A1* | 12/2017 | Bruce | G07C 9/00571 |
| 2018/0197114 A1* | 7/2018 | Chen | H04L 67/18 |

* cited by examiner

INTELLIGENT RESERVATION METHOD AND DEVICE FOR SEAT, AND COMPUTER-READABLE STORAGE MEDIUM

The present application claims the priority right of Chinese patent application with the application No. of 201810902289.4, filed on Aug. 9, 2018 in China, which is incorporated by reference herein in its entirety as a portion of the present application.

TECHNICAL FIELD

The present disclosure relates to the field of public resource allocation technology, and more particularly to an intelligent reservation method and device for a seat, and a computer-readable storage medium.

BACKGROUND

In order to facilitate people's work and study, many public places have seats for everyone to use, such as school classrooms, restaurants, and other crowded places. If these public resources can be allocated reasonably, it will bring significant convenience to everyone. However, due to not knowing enough of distribution and usage information of public resources, allocation of seat resources is unreasonable, and it takes a long time for users to find suitable seats, which causes waste of time and resources.

SUMMARY

The present disclosure provides an intelligent reservation method and device for a seat, and a computer-readable storage medium, which are used to solve the technical problem of unreasonable allocation of seat resources, and the waste of time and resources caused in an attempt to find seats.

In a first aspect, the present disclosure provides an intelligent reservation method for a seat, comprising: sending a seat information acquisition request; receiving and displaying seat distribution information and seat usage status information of a target site fed back by a server-end device for the seat information acquisition request; receiving a reservation request for a target seat inputted by a user, and sending the reservation request; and receiving and displaying a reservation success message or a reservation failure message fed back by the server-end device for the reservation request.

In a second aspect, the present disclosure provides an intelligent reservation method for a seat, comprising: receiving a seat information acquisition request; invoking, according to the seat information acquisition request, seat distribution information and seat usage status information of a target site and feeding the information back to a terminal device; receiving a reservation request for a target seat; and processing the reservation request, and feeding back, to the terminal device, a reservation success message or a reservation failure message corresponding to the reservation request.

In a third aspect, the present disclosure provides an intelligent reservation device for a seat, comprising: a request sending module configured to send a seat information acquisition request, and receive a reservation request for a target seat inputted by a user and send the reservation request; a receiving and displaying module configured to receive and display seat distribution information and seat usage status information of a target site fed back by a server-end device for the seat information acquisition request, and receive and display a reservation success message or a reservation failure message fed back by the server-end device for the reservation request.

In a fourth aspect, the present disclosure provides an intelligent reservation device for a seat, comprising: a request receiving module configured to receive a seat information acquisition request sent by a terminal device, and receive a reservation request for a target seat; and a processing feedback module configured to invoke, according to the seat information acquisition request, seat distribution information and seat usage status information of a target site and feed the information back to a terminal device, and configured to process the reservation request, and feed back, to the terminal device, a reservation success message or a reservation failure message corresponding to the reservation request.

In a fifth aspect, the present disclosure provides a terminal device, comprising: a memory and a processor that are electrically connected; and at least one program stored in the memory and configured to implement, when being executed by the processor, the intelligent reservation method for a seat provided by the first aspect of the present application.

In a sixth aspect, the present disclosure provides a server-end device comprising: a memory and a processor that are electrically connected; and at least one program stored in the memory and configured to implement, when being executed by the processor, the intelligent reservation method for a seat provided by the second aspect of the present application.

In a seventh aspect, the present disclosure provides a computer-readable storage medium having stored thereon a computer program that, when executed by a processor, implements the intelligent reservation method for a seat provided by the first aspect of the present application.

In an eighth aspect, the present disclosure provides a computer-readable storage medium having stored thereon a computer program that, when executed by a processor, implements the intelligent reservation method for a seat provided by the second aspect of the present application.

BRIEF DESCRIPTION OF THE DRAWINGS

In order to more clearly illustrate the technical solutions in the embodiments of the present disclosure, the drawings to be used in the description of the embodiments of the present disclosure will be briefly described below.

DETAILED DESCRIPTION OF THE EMBODIMENTS

In order to solve the technical problem of time and resource waste caused by looking for seats in public places that the users face currently, the present disclosure provides an intelligent reservation method and device for a seat, and a computer-readable storage medium.

Figure 1:
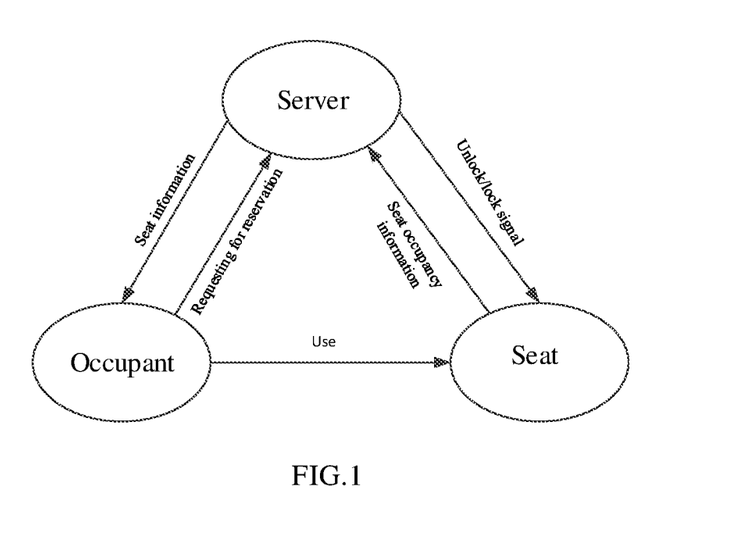
FIG. 1 is a schematic diagram of the overall architecture of an intelligent reservation method for a seat according to an embodiment of the present disclosure.

The intelligent reservation method for a seat provided by the present disclosure enables the users to receive and visually query the seat distribution information and the seat usage status information of a target site, and make a reasonable reservation for a seat according to the queried information. The reservation request involved in the method optionally carries a reservation mode for the target seat, which is beneficial to finding suitable seats in the shortest possible time according to different needs and different authorities of the users. FIG. 1 is a schematic diagram of the overall architecture of an intelligent reservation method for a seat according to an embodiment of the present disclosure. The design principles of the embodiments of the present disclosure are to be generally described below in conjunction with FIG. 1.

The present disclosure mainly relates to three roles: a server (belonging to a server-end device), an occupant (also called a user) and a seat. The occupant sends a seat information acquisition request to the server to inform the server that someone is requesting a reservation. The server receives the seat information acquisition request sent by the occupant, and invokes, according to the seat information acquisition request, seat information of a target site and feeds the seat information of the target site to the occupant. The server obtains relevant seat information and processes the reservation request. For example, the server sends to the seat a signal for unlocking the seat or a signal for locking the seat.

Figure 2:
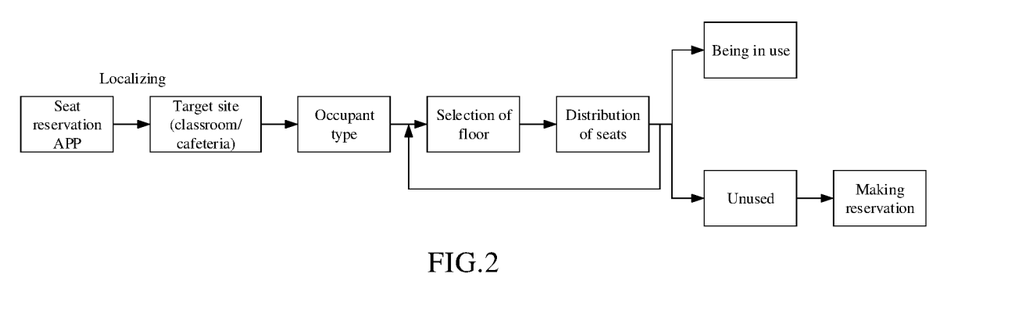
FIG. 2 is a schematic diagram of an intelligent reservation method for a seat executed by a terminal device according to an embodiment of the present disclosure.

FIG. 2 is a schematic diagram of an intelligent reservation method for a seat executed by a terminal device according to an embodiment of the present disclosure. The main operating flow that the user uses the terminal device provided by the embodiment of the present disclosure is generally introduced with reference to FIG. 2.

First, the user opens a seat reservation APP (application) installed on the terminal device provided by the embodiment of the present disclosure; the terminal device can be automatically located to a target site (such as a classroom, or a cafeteria); according to the distribution of seats in each room on all floors of the target site displayed by the terminal device, the user can know the seat situations of all the seats on a floor by selecting the floor (n≥1), wherein the seat situations include the location and usage status. The user can reserve an unused seat based on his or her personal circumstances.

The embodiments of the present disclosure are described in detail below, and the examples of the embodiments are illustrated in the drawings, wherein the same or similar reference numerals are used to refer to the same or similar elements or elements having the same or similar functions. The embodiments described below with reference to the drawings are illustrative, only intended to interpret the present disclosure, and are not to be construed as limiting the present disclosure.

Those skilled in the art will understand that unless otherwise explicitly stated, the singular forms "a/an", "one", "the/said" may also include the plural forms. It will be further understood that the word "comprise" or "include" used in the specification of the present disclosure is intended to mean the presence of the features, integers, steps, operations, elements and/or components, but does not exclude the presence or addition of one or more other features, integers, steps, operations, elements, components and/or groups thereof. It will be understood that when an element is referred to as being "connected" or "coupled" to other element, it may be directly connected or coupled to the other element, or there may be also a middleware. Further, "connected" or "coupled" as used herein may include wireless connection or wireless coupling. The phrase "and/or" used herein includes all or any one of and all combinations of one or more of the associated listed items.

For the objectives, the technical solutions and the advantages of the present disclosure to be more clear, implementations of the present disclosure will be described in further detail below with reference to FIGS. 3A and 3B and FIGS. 4 to 8.

Figure 3A:
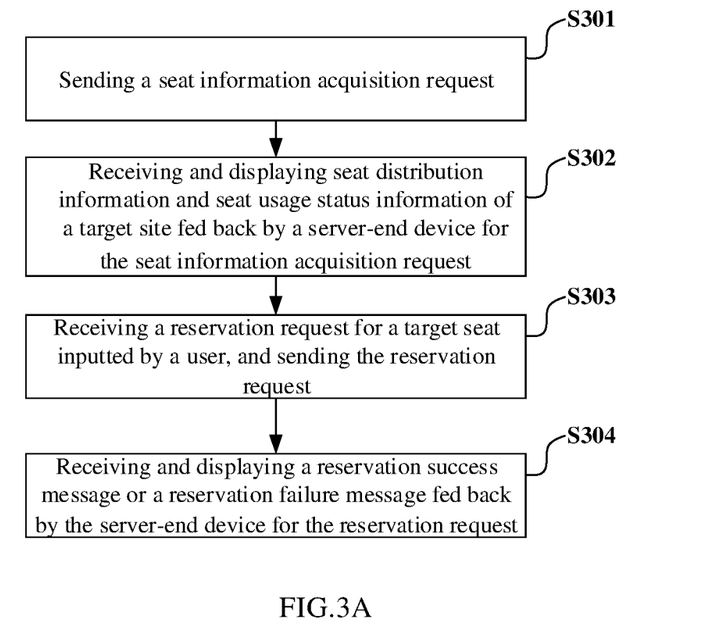
FIGS. 3A and 3B are schematic diagrams showing main flows of an intelligent reservation method for a seat executed by a terminal device and main flows of an intelligent reservation method for a seat executed by a server-end device according to an embodiment of the present disclosure, respectively.

In a first aspect, FIG. 3A is a schematic diagram showing main flows of an intelligent reservation method for a seat executed by a terminal device according to an embodiment of the present disclosure. As shown in FIG. 3A, an intelligent reservation method for a seat (by a terminal device) according to an embodiment of the present disclosure mainly comprises the following steps.

At step S301, a seat information acquisition request is sent.

Optionally, the terminal device carries an occupant type inputted by the user in the seat information acquisition request, and send the seat information acquisition request to the server-end device. The occupant type may include: multi-person occupancy, single-person occupancy, multi-person consecutive-seats occupancy, etc.

At step S302, seat distribution information and seat usage status information of a target site fed back by a server-end device for the seat information acquisition request is received and displayed.

Optionally, displaying seat distribution information of a target site comprises: displaying floor distribution information, room distribution information and seat distribution information of each room on each floor of the target site. Displaying seat usage status information of a target site comprises displaying at least one of the following seat status information of the target site: the used seat, the occupied unused seat and the unoccupied seat.

Optionally, the terminal device may configure and display a first graphic element, a second graphic element and a third graphic element for the used seat, the occupied unused seat and the unoccupied seat, respectively. Specifically, the terminal device displays the used seat as black, the occupied unused seat as red, and the unoccupied seat as blue.

At step S303, a reservation request for a target seat inputted by a user is received, and the reservation request is sent.

In addition, the reservation request for the target seat may also carry a reservation mode, thereby the user should also select the reservation mode of the target seat when inputting the reservation request, so that the server-end device receiving the reservation request can execute the intelligent reservation method for a seat based on different needs and different authorities of the users. Execution process of the server-end device will be further described later. The reservation mode includes a normal lock mode, a forced lock mode and an expedited scrambling mode. In the embodiments of present application, the target seat may include different numbers of seats, e.g., one seat or multiple seats, depending on different needs of users.

Optionally, the reservation mode displayed by the terminal device for the user to select is associated with the user's credit score. For example, if the target seat is an unoccupied seat and a credit score of the sender of the reservation request belongs to a basic credit level, the normal lock mode in the reservation mode is displayed, and when receiving a selection operation for the normal lock mode from the user, the reservation mode carried in the reservation request is set as the normal lock mode; if the target seat is an occupied unused seat and a credit score of the sender of the reservation request belongs to an advanced credit level, the normal lock mode, the forced lock mode and the expedited scrambling mode in the reservation mode are displayed, and when receiving a selection operation for the normal lock mode, the forced lock mode or the expedited scrambling mode from the user, the reservation mode carried in the reservation request is set as the normal lock mode, the forced lock mode or the expedited scrambling mode that has been selected.

At step S304, a reservation success message or a reservation failure message fed back by the server-end device for the reservation request is received and displayed. In addition, according to the embodiment of the present disclosure, the terminal device may need to send unlock information to the server-end device, in this way, the server-end device can assume that the user to which the terminal device belongs has already used the target seat, therefore, after a reservation success message fed back by the server-end device for the reservation request is received and displayed, optionally, the following operation may be performed:

At step S305, an identify code of the target seat involved in the reservation success message is acquired, unlock information for the target seat is generated, and then the unlock information is sent.

Optionally, the terminal device needs to send the unlock information to the server-end device within a predetermined time period after the reservation success message is received.

In addition, if the target seat (which may include one seat or multiple seats depending on different needs of users) involved in the reservation success message is not exactly what the user to which the terminal device belongs desires (for example, the user desires three consecutive seats (e.g., ABC), but there are no three consecutive seats in the target site, the user may reserve two consecutive seats (e.g., AB) and a single seat (e.g., D) not adjacent to the two consecutive seats, as the target seat), and the user may desire to exchange seats with other users (for example, the user may desire to exchange the single seat (e.g., the seat D) (a seat intended to be exchanged in the target seat) with a desired seat (e.g., the seat C) (a seat occupied by other user but desired to be exchanged with the seat intended to be exchanged in the target seat)). At this time, the reservation method for a seat may further comprise step S306 and step S307.

At step S306, after an identify code of the target seat involved in the reservation success message is acquired, a seat exchange request requesting exchange of seats with other users is sent.

Optionally, the terminal device receives the seat exchange request inputted by the user and carrying the identify code of the target seat, location information of a seat intended to be exchanged in the target seat, and location information of a desired seat and/or the reservation mode of the target seat (optional), and sends the seat exchange request to the server-end device.

At step S307, an exchange success message or an exchange failure message fed back by the server-end device for the seat exchange request is received and displayed.

Optionally, if the exchange success message is received by the terminal device from the server-end device, the reservation modes of the desired seat and the seat intended to be exchanged in the target seat are displayed as the forced lock mode.

Figure 3B:
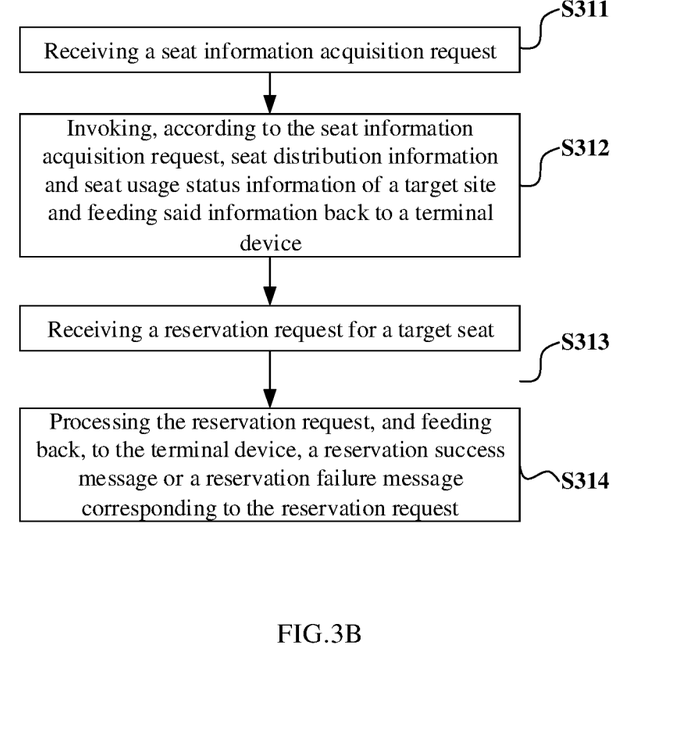

In a second aspect, FIG. 3B is a schematic diagram showing main flows of an intelligent reservation method for a seat executed by a server-end device according to an embodiment of the present disclosure. As shown in FIG. 3B, an intelligent reservation method for a seat (by a server-end device) according to an embodiment of the present disclosure mainly includes the following steps.

At step S311, a seat information acquisition request is received.

At step S312, according to the seat information acquisition request, seat distribution information and seat usage status information of a target site is invoked, and the information is fed back to a terminal device, such that the terminal device displays the seat distribution information and the seat usage state information of the target site.

Optionally, the server-end device parses out an occupant type from the received seat information acquisition request of the terminal device, and invokes seat distribution information and seat usage status information in conformity with the occupant type in the target site, such that the terminal device displays the seat distribution information and the seat usage state information in conformity with the occupant type in the target site.

At step S313, a reservation request for a target seat is received.

In addition, the reservation request for the target seat may also carry a reservation mode, so that the server-end device receiving the reservation request can execute the intelligent reservation method for a seat based on different needs and different authorities of the users. The reservation mode includes a normal lock mode, a forced lock mode and an expedited scrambling mode.

At step S314, the reservation request is processed, and a reservation success message or a reservation failure message corresponding to the reservation request is fed back to the terminal device, such that the terminal device displays the reservation success message or the reservation failure message.

Optionally, in the case where the reservation mode carries no reservation mode, if the target seat involved in the reservation request is in an unoccupied state, permission information for the terminal device to lock the target seat in respect of the reservation request is generated, and the permission information for the terminal device to lock the target seat in respect of the reservation request is carried in the reservation success message; and if the target seat involved in the reservation request is in an occupied unused state or a used state, a reservation failure message is generated. In addition, in the case where the reservation success message carries the permission information, when the user to which the terminal device belongs does not use the target seat within a predetermined time period after the server-end device feeds back the reservation success message, the resources of the target seat occupied by the user to which the terminal device belongs are released.

Optionally, in the case where the reservation request carries the reservation mode, if the reservation mode carried in the reservation request is the normal lock mode or the forced lock mode and the target seat involved in the reservation request is in an unoccupied state, permission information for the terminal device to apply normal lock or forced lock to the target seat in respect of the reservation request is generated and the permission information is carried in the reservation success message; and if the reservation mode carried in the reservation request is the normal lock mode and the target seat involved in the reservation request is in the occupied unused state or in a used state, a reservation failure message is generated.

Optionally, in the case where the reservation mode carried in the reservation request is the expedited scrambling mode (in this case, the credit score of the user to which the terminal device that sent the reservation request belongs is of the advanced level) and the target seat involved in the reservation request is in an occupied unused state, it is determined whether the reservation mode of the target seat selected by another user who has already occupied the target seat is the normal lock mode or the forced lock mode. When the reservation mode of the target seat selected by said another user is determined as the normal lock mode, permission information for the terminal device to apply forced lock to the target seat in respect of the reservation request is generated, and the permission information is carried in the reservation success message, and when the reservation mode of the target seat selected by said another user is determined to be the forced lock mode, a reservation failure message is generated.

Optionally, when the reservation mode of the target seat selected by said another user is determined as the normal lock mode, if the permission information for the terminal device to apply forced lock to the target seat in respect of the reservation request is generated, a credit score of said another user (who has already occupied the target seat but is "expedited scrambled" the target seat) is increased.

Optionally, according to the embodiment of the present disclosure, the server-end device may need to receive unlock information from the terminal device to determine whether the user to which the terminal device belongs uses the target seat or not. In this case, when the server-end device does not receive unlock information of unlocking the target seat by the terminal device from the terminal device within a predetermined time period after feeding back the reservation success message, the credit score of the user to which the terminal device belongs is deducted.

Specifically, when the reservation success message carries the permission information of normal lock, if the unlock information of unlocking the target seat by the terminal device is received within a first time period, it is determined that the user to which the terminal device belongs has used the target seat; otherwise, the credit score of the user is deducted. When the reservation success message carries the permission information of forced lock, if the unlock information of unlocking the target seat by the terminal device is received within a second time period, it is determined that the user to which the terminal device belongs has used the target seat; otherwise, the forced lock is downgraded to the normal lock and the permission information of the normal lock is carried in a regenerated reservation success message and returned, and the credit score of the user is double deducted, and it continues to determine whether the unlock information of unlocking the target seat by the terminal device is received within the first time period after the regenerated reservation success message is returned, in this case, if the unlock information of unlocking the target seat by the terminal device is received within the first time period, it is determined that the user to which the terminal device belongs has used the target seat; and if the unlock information of unlocking the target seat by the terminal device is not received within the first time period, the credit score of the user is further deducted. Preferably, the first time period is longer than the second time period.

Optionally, in view of the different number of seats reserved by the user, the server-end device may also set corresponding reward and punishment measures. For example, if a user applies for a reservation of two seats, and fails to unlock within a predetermined time period after the permission information of expedited scrambling (belonging to forced lock) is fed back, 4 is subscribed from the credit score of the user, and if it is the normal lock instead of expedited scrambling, 2 is subscribed from the credit score of the user. In addition, when two seats of another user are both robbed away because of expedited scrambling (i.e., expedited robbing), 2 is added to the credit score of the other user.

Figure 5:
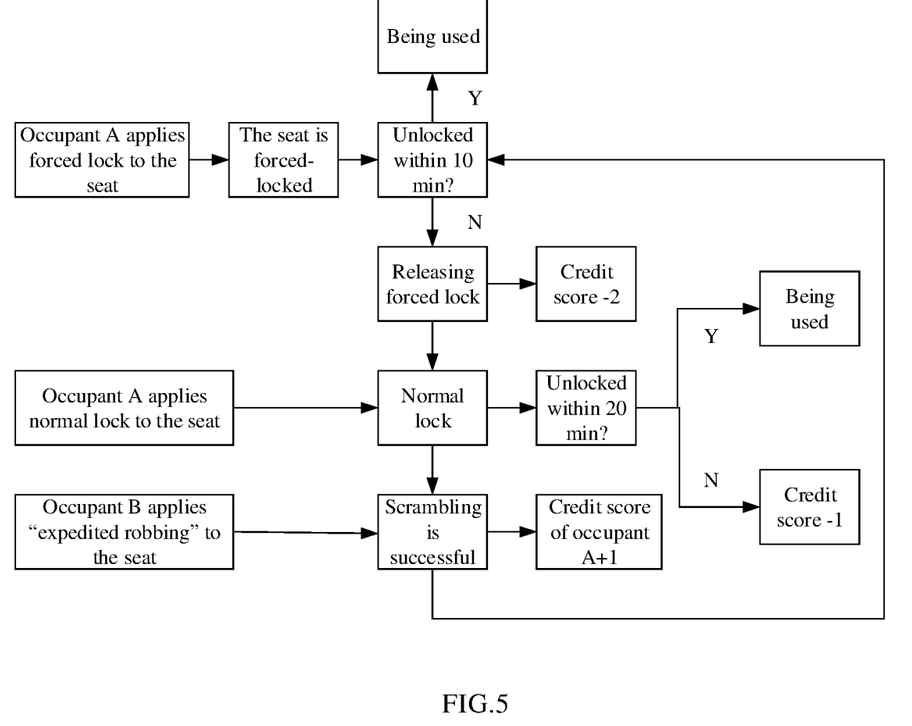
FIG. 5 is a schematic diagram of an example of an intelligent reservation method for a seat executed by a server-end device based on a credit score system according to an embodiment of the present disclosure.

An example of the intelligent reservation of a seat by the server-end device based on the user's credit score is described below with reference to FIG. 5.

For example, the server-end device considers in default that each user with a successful registration has an equal initial credit score (e.g., 70 points), and adjusts the credit score according to the user's later operations. The server-end device also gives the user whose credit score is in a first range (e.g., $60 \leq X < 80$) the right of normal lock to the seat, and gives the user whose credit score is in a second range (e.g., $80 \leq X \leq 100$) the right of normal lock or forced lock to the seat, wherein the minimum value of the second range is greater than or equal to the maximum value of the first range. When the credit score is less than the minimum value of the first range, the user is prohibited from using the reservation function. In this case, the server-end device will warn the user and freeze the user's account for one month, one month later, the user account is restored and the point is restored to the initial credit score. The account is authenticated by real name, and each user can only create one account.

The intelligent reservation method of a seat by the server-end device based on the user's credit score generally covers one of the following four scenarios.

Scenario 1, credit scores of A (belonging to another user) and B (belonging to the user) are in the first range:

First, A applies normal lock to the seat, and if the server-end device does not receive the unlock information for the seat sent by the terminal device of A within 20 minutes after the permission information of normal lock is fed back, 1 is subtracted from the credit score of A. In this case, the server-end device prohibits B from applying "expedited scrambling" to the seat of A.

Scenario 2, the credit score of A is in the first range and the credit score of B is in the second range:

First, A applies normal lock to the seat, and if the server-end device does not receive the unlock information for the seat sent by the terminal device of A within 20 minutes after the permission information of normal lock is fed back, 1 is subtracted from the credit score of A. In the case where A applies normal lock to the seat, the server-end device allows B to "expedited scramble" the seat of A (e.g., the expedited robbing in the drawing), 1 is added to the credit score of A as a compensation reward, and the seat is reserved for B (forced lock), and if the server-end device does not receive the unlock information for the seat sent by the terminal device of B within 10 minutes after the permission information for the forced lock is fed back, 2 is subtracted from the credit score of B and B's forced lock to the seat becomes normal lock. In addition, if the server-end device still does not receive the unlock information sent by the terminal device of B within 20 minutes after the permission information for the normal lock is fed back, 1 is further subtracted from the credit score of B.

Scenario 3, the credit score of A is in the second range, and the credit score of B is in the first range:

In this case, A has the right to select normal lock and forced lock when inputting the reservation mode for a seat. If the normal lock is selected, it is like Scenario 1; and when the forced lock is selected, if the server-end device does not receive the unlock information for the seat sent by the terminal device of A within 10 minutes after feeding back the permission information of forced lock, 2 is subtracted from the credit score of A and A's forced lock to the seat becomes normal lock. In addition, if the server-end device still does not receive the unlock information sent by the terminal device of A within 20 minutes after the permission information for the normal lock is sent, 1 is subtracted from the credit score of A.

Scenario 4, the credit scores of A and B both are in the second range:

It should be noted that under Scenario 4, A has the right to select normal lock and forced lock when inputting the reservation mode for a seat. If the normal lock is selected, it is like Scenario 2; and if the forced lock is selected, B cannot apply "expedited scrambling" to the seat of A.

Optionally, as previously mentioned, the target seat reserved by the user may not be what is ultimately expected, and seat exchange with other users may be required. Therefore, after processing the reservation request and feeding back the reservation success message corresponding to the reservation request to the terminal device, the server-end device further optionally performs the following operations.

At step S315, a seat exchange request requesting exchange of seats with other users is received.

Seat exchange is particularly suitable for multi-person consecutive-seats occupancy in the occupant type, as it is difficult to find consecutive seats that meet requirements in the case of multi-person consecutive-seats occupancy. At this time, the server-end device receives the seat exchange request from the terminal device and processes the seat exchange request as described below, and finally enables the user to obtain multiple consecutive seats.

Optionally, the seat exchange request carrying the identify code of the target seat, location information of a seat intended to be exchanged in the target seat, and location information of a desired seat and/or the reservation mode of the target seat (optional) as sent from the terminal-device is received.

At step S316, the reservation request is processed, and an exchange success message or an exchange failure message corresponding to the seat exchange request is fed back to the terminal device.

Optionally, the server-end device forwards the (received) seat exchange request to a terminal device corresponding to another user who has already occupied the desired seat, and acquires feedback information of the terminal device corresponding to the other user for the seat exchange request.

If the feedback information received by the server-end device is exchange agreement information, the reservation modes of the desired seat and the seat intended to be exchanged in the target seat are set as the forced lock mode. A different score is added to the credit score of the other user corresponding to the terminal device that releases the resource corresponding to the desired seat, according to the occupant type of the desired seat. For example, if the other user accepts the single-seat exchange request, 1 is added to this user's credit score, and if the user accepts a two-seat exchange request, 2 is added to this user's credit score.

An example in which the server-end device processes the seat exchange request is described below with reference to FIG. 6.

Figure 6:
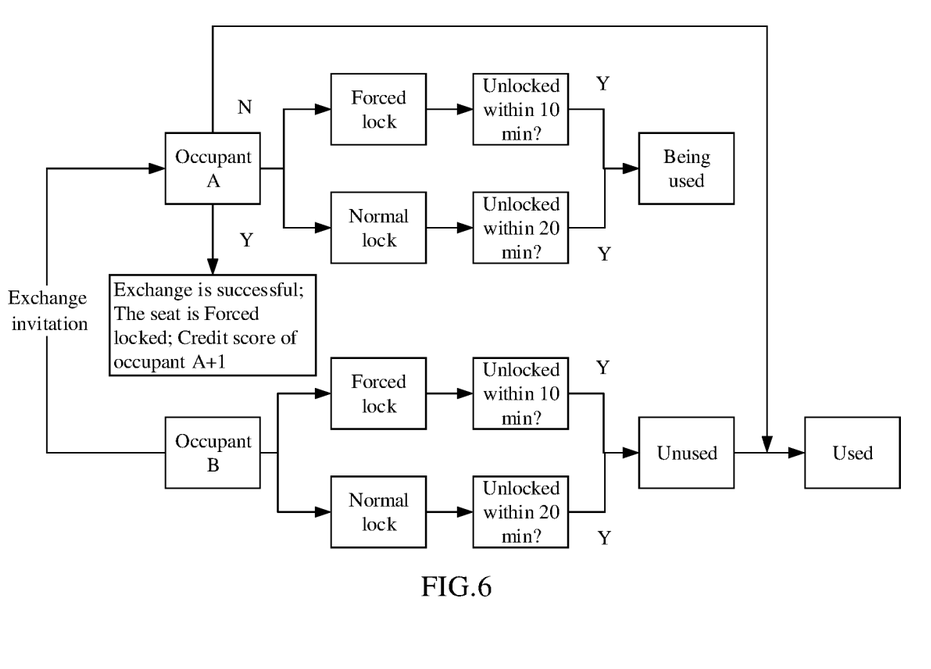
FIG. 6 is a schematic diagram of an example of processing a seat exchange request by a server-end device according to an embodiment of the present disclosure.

For example, referring to FIG. 6, user A (belonging to another user) has occupied (e.g., is using) a seat, and user B has made a successful reservation for another seat but has not used the seat, in this case, user B sends, by his/her terminal device, to the server-end device, a seat exchange request desiring to exchange seats with user A, and the server-end device forwards the seat exchange request to the terminal device of user A. If the server-end device obtains the exchange agreement information selected by user A from the terminal device of user A, the server-end device confirms that the seats are successfully exchanged (at this time, user A and user B can obtain the corresponding seat of each other), and also 1 is added to user A's credit score. In addition, during the period that user A and user B are going to the corresponding seat, the server-end device updates the reservation modes of the seats that have been exchanged between A and B to forced lock, so as to prevent other users from applying "expedited scrambling" to the seats that have been exchanged between A and B.

Figure 4:
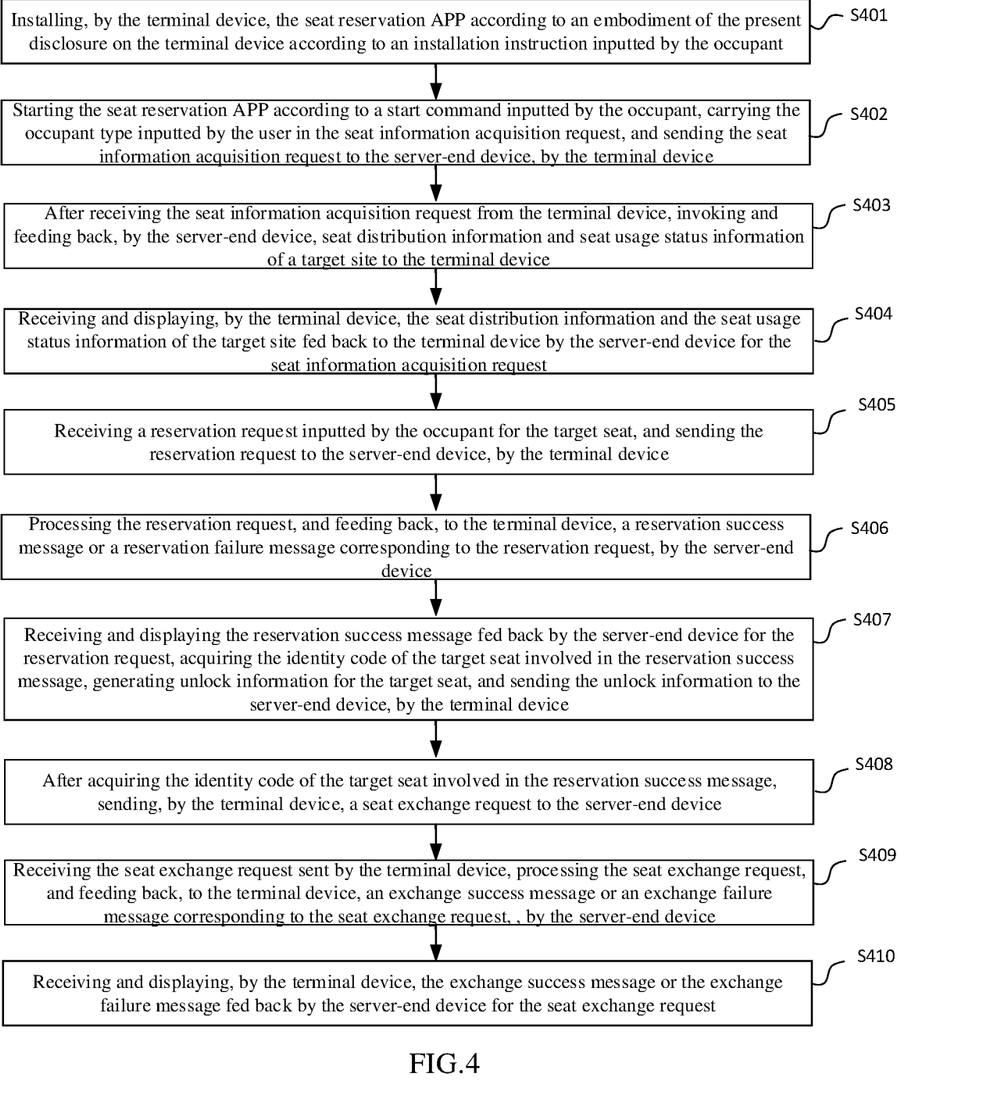
FIG. 4 is a schematic flow diagram of an example of an intelligent reservation method for a seat according to an embodiment of the present disclosure.

FIG. 4 is a schematic flow diagram of an example of an intelligent reservation method for a seat as executed concurrently by the terminal device and the server-end device according to an embodiment of the present disclosure. In the example, the user holding the terminal device is also referred to as an occupant.

At step S401, the terminal device installs the seat reservation APP according to an embodiment of the present disclosure on the terminal device according to an installation instruction inputted by the occupant.

At step S402, the terminal device starts the seat reservation APP according to a start command inputted by the occupant, carries the occupant type inputted by the user in the seat information acquisition request, and sends the seat information acquisition request to the server-end device.

At step S403, after receiving the seat information acquisition request from the terminal device, the server-end device invokes and feeds back seat distribution information and seat usage status information of a target site to the terminal device.

At step S404, the terminal device receives and displays the seat distribution information and the seat usage status information of the target site fed back to the terminal device by the server-end device for the seat information acquisition request.

At step S405, the terminal device receives a reservation request (which may carry a reservation mode) inputted by the occupant for the target seat, and sends the reservation request to the server-end device.

At step S406, the server-end device processes the reservation request, and feeds back, to the terminal device, a reservation success message or a reservation failure message corresponding to the reservation request.

At step S407, the terminal device receives and displays the reservation success message fed back by the server-end device for the reservation request, acquires the identity code of the target seat involved in the reservation success message, generates unlock information for the target seat, and sends the unlock information to the server-end device.

At step S408, after acquiring the identity code of the target seat involved in the reservation success message, the terminal device sends a seat exchange request to the server-end device.

At step S409, the server-end device receives the seat exchange request sent by the terminal device, processes the seat exchange request, and feeds back, to the terminal device, an exchange success message or an exchange failure message corresponding to the seat exchange request.

At step S410, the terminal device receives and displays the exchange success message or the exchange failure message fed back by the server-end device for the seat exchange request.

At step Based on the same inventive concept, an embodiment of the present application further provides an intelligent reservation device for a seat (at the side of the terminal device).

Figure 7A:
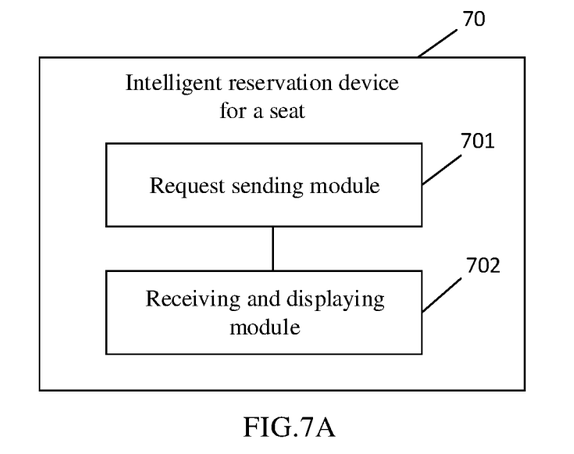
FIGS. 7A and 7B are schematic diagrams showing structure of an intelligent reservation device for a seat at a terminal device and structure of an intelligent reservation device for a seat at a server-end device according to an embodiment of the present disclosure, respectively.

FIG. 7A is a schematic structural diagram of an intelligent reservation device for a seat according to an embodiment of the present disclosure. An intelligent reservation device 70 for a seat according to an embodiment of the present disclosure will be described with reference to FIG. 7A. As shown in FIG. 7A, the intelligent reservation device 70 comprises a request sending module 701 and a receiving and displaying module 702.

The request sending module 701 is configured to send a seat information acquisition request, and receive a reservation request for a target seat inputted by a user for a target seat and send the reservation request. For example, a specific implementation of the request sending module 701 may include a sending interface. According to an embodiment of the present disclosure, the reservation request may also carry a reservation mode.

The receiving and displaying module 702 is configured to receive and display seat distribution information and seat usage status information of a target site fed back by a server-end device for the seat information acquisition request (sent by the request sending module 701), and receive and display a reservation success message or a reservation failure message fed back by the server-end device for the reservation request (sent by the request sending module 701). For example, a specific implementation of the receiving and displaying module 702 may include a display of the terminal device.

Based on the same inventive concept, an embodiment of the present application further provides an intelligent reservation device for a seat (at the side of the server-end device).

Figure 7B:
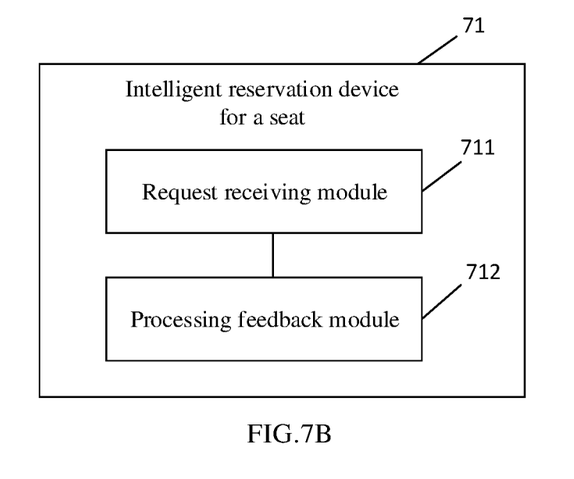

FIG. 7B is a schematic structural diagram of an intelligent reservation device for a seat according to an embodiment of the present disclosure. An intelligent reservation device 71 for a seat provided by the present disclosure will be described with reference to FIG. 7B. As shown in FIG. 7B, the intelligent reservation device 71 comprises a request receiving module 711 and a processing feedback module 712.

The request receiving module 711 is configured to receive a seat information acquisition request sent by a terminal device, and receive a reservation request for a target seat sent from the terminal device. For example, a specific implementation of the request receiving module 711 may include a receiving interface. According to an embodiment of the present disclosure, the reservation request may also carry a reservation mode.

The processing feedback module 712 is configured to invoke, according to the seat information acquisition request sent from the terminal device and received by the request receiving module 711, seat distribution information and seat usage status information of a target site and feed the seat distribution information and the seat usage status information of the target site back to the terminal device, such that the terminal device displays the seat distribution information and the seat usage state information of the target site, and configured to process the reservation request received by the request receiving module 711, and feed back, to the terminal device, a reservation success message or a reservation failure message corresponding to the reservation request, such that the terminal device displays the reservation success message or the reservation failure message. For example, a specific implementation of the processing feedback module 712 may include a processor.

Based on the same inventive concept, an embodiment of the present application further provides a terminal device.

Figure 8:
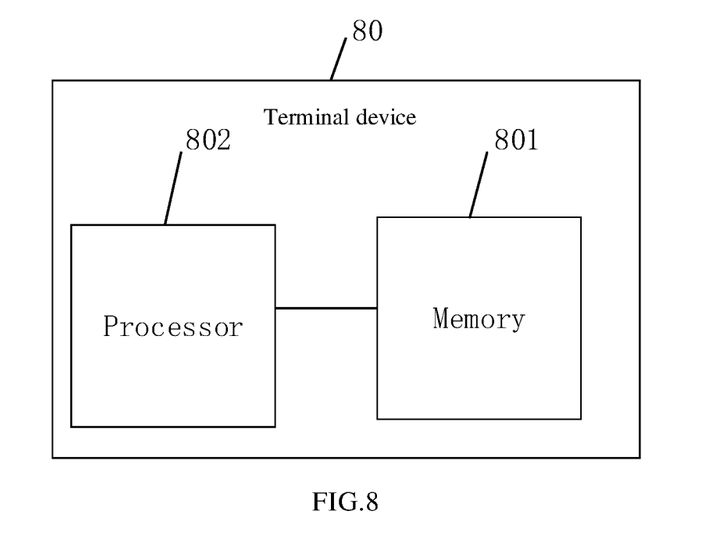
FIG. 8 is a schematic diagram of structure of a terminal device according to an embodiment of the present disclosure.

FIG. 8 is a schematic structural diagram of a terminal device according to an embodiment of the present disclosure.

As shown in FIG. 8, a terminal device 80 provided by an embodiment of the present disclosure comprises:

a memory 801 and a processor 802 that are electrically connected; and at least one program stored in the memory 801 and configured to implement, when being executed by the processor, the intelligent reservation method for a seat provided by the first aspect of the present application.

Based on the same inventive concept, an embodiment of the present application further provides a server-end device.

Figure 9:
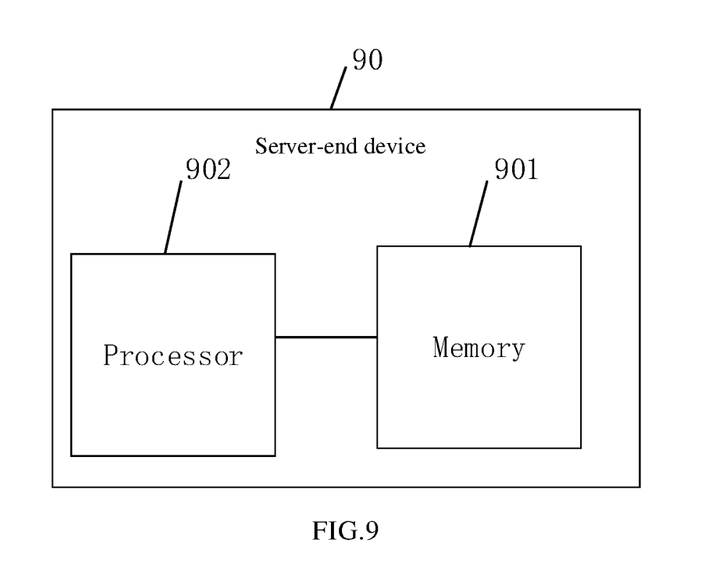
FIG. 9 is a schematic diagram of structure of a server-end device according to an embodiment of the present disclosure.

FIG. 9 is a schematic structural diagram of a server-end device according to an embodiment of the present disclosure.

As shown in FIG. 9, server-end device 90 provided by an embodiment of the present disclosure comprises:

a memory 901 and a processor 902 that are electrically connected; and at least one program stored in the memory 901 and configured to implement, when being executed by the processor 902, the intelligent reservation method for a seat provided by the second aspect of the present application.

Based on the same inventive concept, an embodiment of the present application further provides a computer-readable storage medium having stored thereon a computer program that, when executed by a processor, implements the intelligent reservation method for a seat provided by the first aspect of the present application (i.e., executed by the terminal device).

Based on the same inventive concept, an embodiment of the present application further provides a computer-readable storage medium having stored thereon a computer program that, when executed by a processor, implements the intelligent reservation method for a seat provided by the second aspect of the present application (i.e., executed by the server-end device).

The present disclosure provides an intelligent reservation method and device for a seat, a terminal device and a server-side device. With the embodiments of the present disclosure, automatic inquiry of seats in public places and reasonable reservation of seats can be realized.

The intelligent reservation method of the embodiment of the present disclosure has incorporated the forms of normal lock, forced lock, expedited scrambling, exchange invitation, credit score reward and punishment, etc., further enriching the seat occupy app function.

The present disclosure avoids multiple reservations by multiple people by means of setting the occupant type. The reservation request involved in the embodiment of the present disclosure carries the reservation mode for the target seat, which is beneficial to finding suitable seats in the shortest possible time according to different needs and different authorities of the users, and the good technical effect of improving the seat finding effect is obtained.

It should be understood that although respective steps in the flowchart of the drawings are sequentially displayed in the sequences shown with arrows, these steps are not necessarily performed in the sequences indicated by the arrows. Unless otherwise explicitly stated, execution of these steps is not strictly limited, these steps may be performed in other sequences. Moreover, at least some of the steps in the flowchart of the drawings may include a plurality of sub-steps or stages, which are not necessarily performed at the same time, but may be executed at different moments, also, the execution sequences thereof are not necessarily in sequence, but may be performed in turn or alternately with at least a portion of other steps or sub-steps or stages of other steps.

The above is only some embodiments of the present disclosure, it should be noted that those of ordinary in the art can also make several modifications and improvements without departing from the principles of the present disclosure, these modifications and improvements should also be considered as falling into the protection scope of the present disclosure.

What is claimed is:

1. An intelligent reservation method for a seat, performed by a terminal device, comprising:
    sending a seat information acquisition request;
    receiving and displaying seat distribution information and seat usage status information of a target site fed back by a server-end device for the seat information acquisition request;
    receiving a reservation request for a target seat inputted by a user, and sending the reservation request; and
    receiving and displaying a reservation success message or a reservation failure message fed back by the server-end device for the reservation request,
    wherein the reservation request for the target seat inputted by the user carries a reservation mode, and the reservation mode includes one of a normal lock mode, a forced lock mode and an expedited scrambling mode, and wherein the carried reservation mode is selected by the user, and reservation modes for the user to select are related to a credit score of the user and a seat status of the target seat,
    wherein the seat usage status information of a target site includes one of a used seat, an occupied unused seat, and an unoccupied seat,
    wherein receiving a reservation request for a target seat inputted by a user comprises:
    in response that the target seat is an unoccupied seat and a credit score of the sender of the reservation request belongs to a basic credit level, displaying the normal lock mode in the reservation mode, and when receiving a selection operation for the normal lock mode from the user, setting the reservation mode carried in the reservation request as the normal lock mode; and
    in response that the target seat is an occupied unused seat and a credit score of the sender of the reservation request belongs to an advanced credit level, displaying the normal lock mode, the forced lock mode and the expedited scrambling mode in the reservation mode, and when receiving a selection operation for the normal lock mode, the forced lock mode or the expedited scrambling mode from the user, setting the reservation mode carried in the reservation request as the normal lock mode, the forced lock mode or the expedited scrambling mode that has been selected.

2. The intelligent reservation method for a seat according to claim 1, wherein before sending a seat information acquisition request, an occupant type inputted by the user is carried in the seat information acquisition request.

3. The intelligent reservation method for a seat according to claim 1, wherein
    displaying seat distribution information of a target site comprises: displaying floor distribution information, room distribution information and seat distribution information of each room on each floor of the target site; and
    displaying seat usage status information of a target site comprises displaying at least one of the following seat status information in the target site: a used seat, an occupied unused seat and an unoccupied seat.

4. The intelligent reservation method for a seat according to claim 3, wherein displaying at least one of the following seat status information in the target site: the used seat, the occupied unused seat, and the unoccupied seat comprises: configuring and displaying a first graphic element, a second graphic element and a third graphic element for the used seat, the occupied unused seat and the unoccupied seat, respectively.

5. The intelligent reservation method for a seat according to claim 1, wherein after receiving and displaying a reservation success message fed back by the server-end device for the reservation request, the method further comprises:
    acquiring an identify code of the target seat involved in the reservation success message, generating unlock information for the target seat, and sending the unlock information.

6. The intelligent reservation method for a seat according to claim 5, wherein after acquiring an identify code of the target seat involved in the reservation success message, the method further comprises:
    sending a seat exchange request requesting exchange of seats with other users; and
    receiving and displaying an exchange success message or an exchange failure message fed back by the server-end device for the seat exchange request.

7. The intelligent reservation method for a seat according to claim 6, wherein sending a seat exchange request comprises:
    receiving the seat exchange request inputted by the user and carrying the identify code of the target seat, location information of a seat intended to be exchanged in the target seat, and location information of a desired seat and/or the reservation mode of the target seat, and sending the seat exchange request;
    receiving and displaying an exchange success message or an exchange failure message fed back by the server-end device for the seat exchange request comprises:
    in response that the exchange success message is received, displaying the reservation modes of the seat intended to be exchanged in the target seat and the desired seat as the forced lock mode.

8. An intelligent reservation method for a seat, performed by a server-end device, comprising:

receiving a seat information acquisition request;

invoking, according to the seat information acquisition request, seat distribution information and seat usage status information of a target site and feeding said information back to a terminal device;

receiving a reservation request for a target seat; and processing the reservation request, and feeding back, to the terminal device, a reservation success message or a reservation failure message corresponding to the reservation request, wherein the reservation request for the target seat carries a reservation mode, and the reservation mode includes one of a normal lock mode, a forced lock mode and an expedited scrambling mode, and wherein the carried reservation mode is selected by a user, and reservation modes for the user to select are related to a credit score of the user and a seat status of the target seat, wherein the seat usage status information of a target site includes one of a used seat, an occupied unused seat, and an unoccupied seat, wherein processing the reservation request, and feeding back, to the terminal device, a reservation success message or a reservation failure message corresponding to the reservation request comprises:

in the case where the target seat involved in the reservation request is in an unoccupied state, generating permission information for the terminal device to lock the target seat in respect of the reservation request, and carrying the permission information for the terminal device to lock the target seat in respect of the reservation request in the reservation success message; in the case where the target seat involved in the reservation request is in an occupied unused state or a used state, generating a reservation failure message;

in the case where the reservation mode in the reservation request is the normal lock mode or the forced lock mode and the target seat involved in the reservation request is in an unoccupied state, generating permission information for the terminal device to apply normal lock or forced lock to the target seat in respect of the reservation request, and carrying the permission information for the terminal device to apply normal lock or forced lock to the target seat in respect of the reservation request in the reservation success message; and in the case where the reservation mode in the reservation request is the normal lock mode and the target seat involved in the reservation request is in the occupied unused state or the used state, generating a reservation failure message; and in the case where the reservation mode in the reservation request is the expedited scrambling mode and the target seat involved in the reservation request is in an occupied unused state, determining that the reservation mode of the target seat selected by another user who has already occupied the target seat is the normal lock mode or the forced lock mode, and when the reservation mode of the target seat selected by said another user is determined as the normal lock mode, generating permission information for the terminal device to apply forced lock to the target seat in respect of the reservation request, and carrying the permission information for the terminal device to apply forced lock to the target seat in the reservation success message, and when the reservation mode of the target seat selected by said another user is determined to be the forced lock mode, generating the reservation failure message.

9. The intelligent reservation method for a seat according to claim 8, wherein invoking, according to the seat information acquisition request, seat distribution information and seat usage status information of a target site and feeding said information back to a terminal device comprises:

parsing out an occupant type from the received seat information acquisition request; and invoking seat distribution information and seat usage status information in conformity with the occupant type in the target site.

10. The intelligent reservation method for a seat according to claim 8, wherein the method further comprises:

when the reservation mode of the target seat selected by said another user is determined as the normal lock mode, in response that the permission information for the terminal device to apply forced lock to the target seat in respect of the reservation request is generated, adding to another credit score of said another user who has already occupied the target seat.

11. The intelligent reservation method for a seat according to claim 8, wherein the method further comprises:

when unlock information of unlocking the target seat by the terminal device is not received from the terminal device within a predetermined time period after the reservation success message is fed back, deducting from the credit score of the user to which the terminal device belongs.

12. The intelligent reservation method for a seat according to claim 8, wherein after processing the reservation request, and feeding back, to the terminal device, a reservation success message corresponding to the reservation request, the method further comprises:

receiving a seat exchange request requesting exchange of seats with other users; and processing the reservation request, and feeding back, to the terminal device, an exchange success message or an exchange failure message corresponding to the seat exchange request.

13. The intelligent reservation method for a seat according to claim 12, wherein receiving a seat exchange request requesting exchange of seats with other users comprises:

receiving the seat exchange request carrying the identify code of the target seat, location information of a seat intended to be exchanged in the target seat, and location information of a desired seat and/or the reservation mode of the target seat; and processing the reservation request, and feeding back, to the terminal device, an exchange success message or an exchange failure message corresponding to the seat exchange request comprises:

forwarding the seat exchange request to a terminal device corresponding to another user who has already occupied the desired seat and acquiring feedback information of the terminal device corresponding to said another user for the seat exchange request; and in response that the feedback information received is exchange agreement information, setting the reservation modes of the desired seat and the seat intended to be exchanged in the target seat as the forced lock mode, and according to the occupant type of the desired seat, adding a credit score to or deducting from another credit score of said another user corresponding to the terminal device that releases the resources of the desired seat.

\* \* \* \* \*